United States Patent
Petersen, Jr.

(10) Patent No.: US 6,648,935 B2
(45) Date of Patent: Nov. 18, 2003

(54) DUAL STAGE EXTRACTION BLOWER FOR REMOVING CONTAMINANTS FROM AN AIR STREAM

(76) Inventor: James E. Petersen, Jr., 425 N. Wayside, Houston, TX (US) 77020

( * ) Notice: Subject to any disclaimer, the term of this patent is extended or adjusted under 35 U.S.C. 154(b) by 0 days.

(21) Appl. No.: 10/036,784

(22) Filed: Dec. 21, 2001

(65) Prior Publication Data

US 2003/0115845 A1 Jun. 26, 2003

(51) Int. Cl.⁷ .............................................. B01D 33/00
(52) U.S. Cl. .............................. 55/406; 55/423; 55/438
(58) Field of Search .................... 55/400, 406, 414, 55/423, 438, 466; 415/121.2

(56) References Cited

U.S. PATENT DOCUMENTS

| | | | |
|---|---|---|---|
| 1,037,659 A | * | 9/1912 | Rembert ................... 55/400 |
| 1,274,058 A | | 7/1918 | Kutsche |
| 1,785,918 A | | 12/1930 | Stebbins |
| 1,815,529 A | | 7/1931 | Shurtleff |
| 2,209,607 A | | 7/1940 | Nutting |
| 2,289,474 A | * | 7/1942 | Anderson ................... 55/393 |
| 2,293,590 A | * | 8/1942 | Chance ....................... 209/250 |
| 2,593,294 A | | 4/1952 | Goldberg |
| 2,780,308 A | | 2/1957 | Loftheim |
| 3,796,511 A | | 3/1974 | Hansen |
| 3,827,482 A | | 8/1974 | Pope |
| 3,942,500 A | | 3/1976 | Koehm et al. |
| 4,361,490 A | | 11/1982 | Saget |
| 4,382,804 A | | 5/1983 | Mellor |
| 4,468,234 A | | 8/1984 | McNicholas |
| 4,832,709 A | | 5/1989 | Nagyszalanczy |
| 4,877,424 A | | 10/1989 | Perkola et al. |
| 5,000,769 A | | 3/1991 | Raguideau et al. |
| 5,766,315 A | | 6/1998 | Moredock |
| 6,293,751 B1 | | 9/2001 | Stockstill |

FOREIGN PATENT DOCUMENTS

| | | |
|---|---|---|
| GB | 687031 | 2/1953 |
| JP | 62-276297 | 12/1987 |
| SU | 348214 | 9/1972 |

OTHER PUBLICATIONS

"Installation Operation and Maintenance, Roto–Clone Dynamic Precipitator Type D", Service Bulletin DC–139D, American Air Filter Company, Inc., Louisville, KY with a copy of "Industrial Ventilation 20th Edition: A Manual of Recommended Practice," 1988, Committee on Industrial Ventilation, Lansing, Michigan.

\* cited by examiner

Primary Examiner—Robert A. Hopkins
(74) Attorney, Agent, or Firm—Bracewell & Patterson LLP

(57) ABSTRACT

A two stage extracting blower that cleans liquid and solid contaminants from supply air, and provides high velocity air for cooling equipment, personnel and/or structures. In a first air cleaning stage, the blower uses air velocity and the centrifugal force of a rotating impeller to separate heavier contaminants entrained in a dirty air stream into a rear partitioned chamber of the blower housing. In a second air cleaning stage, the blower uses centrifugal forces imparted by the impeller on lighter contaminants to cause the contaminants to be collected in a skimmer provided in the partially cleansed air stream prior to release of the air stream from the blower.

47 Claims, 4 Drawing Sheets

DUAL STAGE EXTRACTION BLOWER FOR REMOVING CONTAMINANTS FROM AN AIR STREAM

BACKGROUND OF THE INVENTION

1. Field of the Invention

This invention relates generally to extracting blowers that separate liquid and particulate matter from carrier air. Specifically, this invention relates to extracting blowers that incorporate a dual stage air cleaning system wherein a first stage extracts heavy entrained particles/fluid from the carrier air and a second stage extracts lighter entrained particles/fluid from the carrier air.

2. Description of the Related Art

Air blowers are used in a variety of industries to provide cooling air to personnel, structures and equipment. Oftentimes, the air supply for these air blowers is contaminated with solids (e.g., dirt, grease, metallic and non-metallic dust) and/or liquids (e.g., water, organic and inorganic chemical vapors). When carried in the air passing through a blower, these contaminants can damage equipment by compromising electrical circuits, reducing the efficiency of rotating equipment and decreasing the life of the equipment due to increased friction, corrosion and abrasion between moving parts. Thus, it is common to combine these blowers with devices that can remove or "clean" environmental air contaminants, such as airborne dust, water and other liquid vapors, and other light matter from the blower air. Of course, in addition to causing harm to the environment into and equipment onto which air is blown, contaminants passing through a blower may become trapped in the blower itself, creating a build-up or sludge, which diminishes the effectiveness and useful life of the blower.

Prior art includes several designs for blowers that scrub blown air. Many of these blowers rely on gravity to assist in the separation of the contaminants from the air, and therefore are only effective in removing larger contaminant particles. Other blowers use a complex system of baffles, filters, secondary pressure pumps or fully enclosed housings, which are difficult to maintain, clean and operate.

One type of blower for cooling and ventilation that is well known in the industry is the extraction blower. A well know type of extracting blower is the rotary type blower that cleans contaminated air by drawing the air across the blades of an impeller and using the centrifugal effect of the blades to separate the lighter air from the heavier contaminants. Specifically, the rotation of an impeller within a fan housing creates a low pressure area within the housing that causes air to be axially drawn into the housing. As air enters the housing, it is contacted by the impeller blades and is forced generally outward along the blade by the rotation of the blades. Centrifugal forces cause the lighter air to be forced out to the leading edges of the impeller blades quickly, while forward momentum causes the heavier contaminants within the air to move toward the back of the blade and strike a backplate attached to the back or trailing edge of the impeller blades. Upon striking the backplate, the contaminants migrate outward along the backplate to the plates outward edge, where the contaminants are channeled off.

"In many prior art extracting blower configurations, the fan housing is separated into a front chamber that collects and bleeds off the lighter, clean air and a rearward chamber in which the contaminants are collected. In such configurations, the impeller blade is positioned so as to extend into both chambers. The leading edge of the impeller blade, from which clean air is ejected, is positioned to be in the front chamber and the trailing edge of the impeller, attached to the backplate, is positioned to be in the reward chamber."

Various configurations to this type of fan have been utilized extensively in the prior art, such as for example, the old and well known technique of notching the impeller blades to fit around the wall separating the front and reward chambers, thereby insuring that only a minimal amount of air is lost with the exhaust in the reward chamber. One drawback to prior art extracting blowers of this type is that this tighter "seal", between the front and reward chambers is that a greater quantity of contaminants might remain entrained in the "clean" air as it is bled off. More generally, this is also a drawback to other types of extracting blowers. In environments where the blower air needs to be as clean as possible, it would therefore be desirable to provide an extracting blower where the air is subject to at least two separate cleaning stages.

"As discussed above, often times the contaminants passing through the blower can cause damage to the blower itself. One prior art configuration that has proven particularly susceptible to such damage utilizes a wiper that is welded onto each fan blade. While the wiper is intended to guide particulate matter moving across the fan blade to the reward chamber, it has been found that the solid contaminants in the air tend to strike the weld with sufficient velocity and repetitiveness so as to cause pitting and abrasion to the weld line. This problem is exacerbated as the liquid contaminants begin to erode the weld, especially at the points were the weld has already been weakened by the solid contaminants. Thus, it would further be desirable to provide an extracting blower with fan blades that can guide contaminants to the reward chamber without subjecting the fan blades to damage from the contaminants moving across their surface."

BRIEF SUMMARY OF THE INVENTION

The present invention provides a method and apparatus that addresses these drawbacks of the prior art. Specifically, a blower fan is provided wherein the fan is provided with a dual air cleaning system. The blower fan is comprised of a fan circular housing.

DETAILED DESCRIPTION OF THE INVENTION

Figure 1:
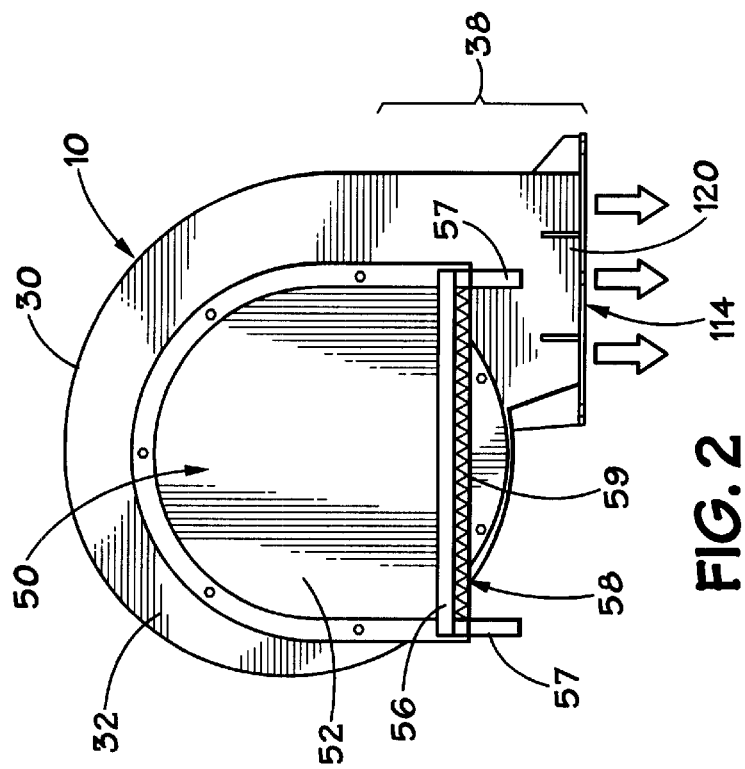
FIG. 1 is a side view of the fan, illustrating the relationship of the fan cowling, the fan housing and the blower motor.
Figure 2:
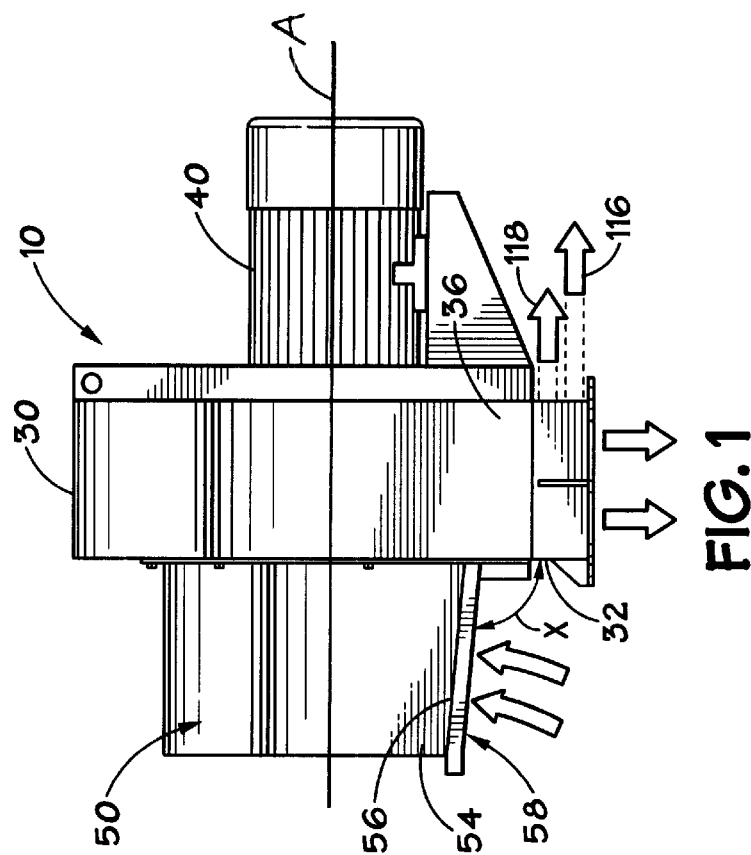
FIG. 2 is a front view of the fan of FIG. 1.
Figure 3:
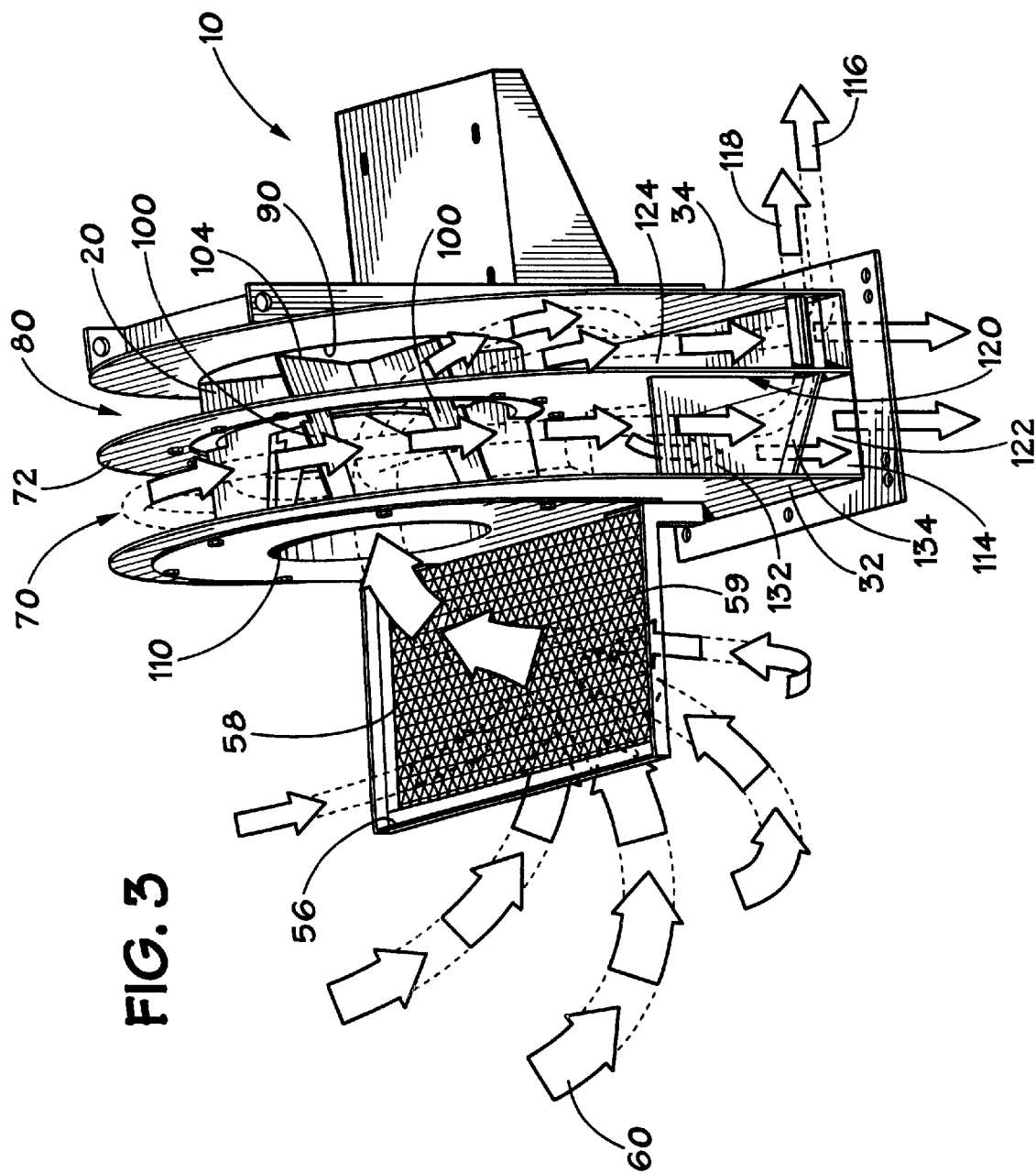
FIG. 3 is an isomeric, cut away view of the fan with the fan cowling and blower motor removed.
Figure 4:
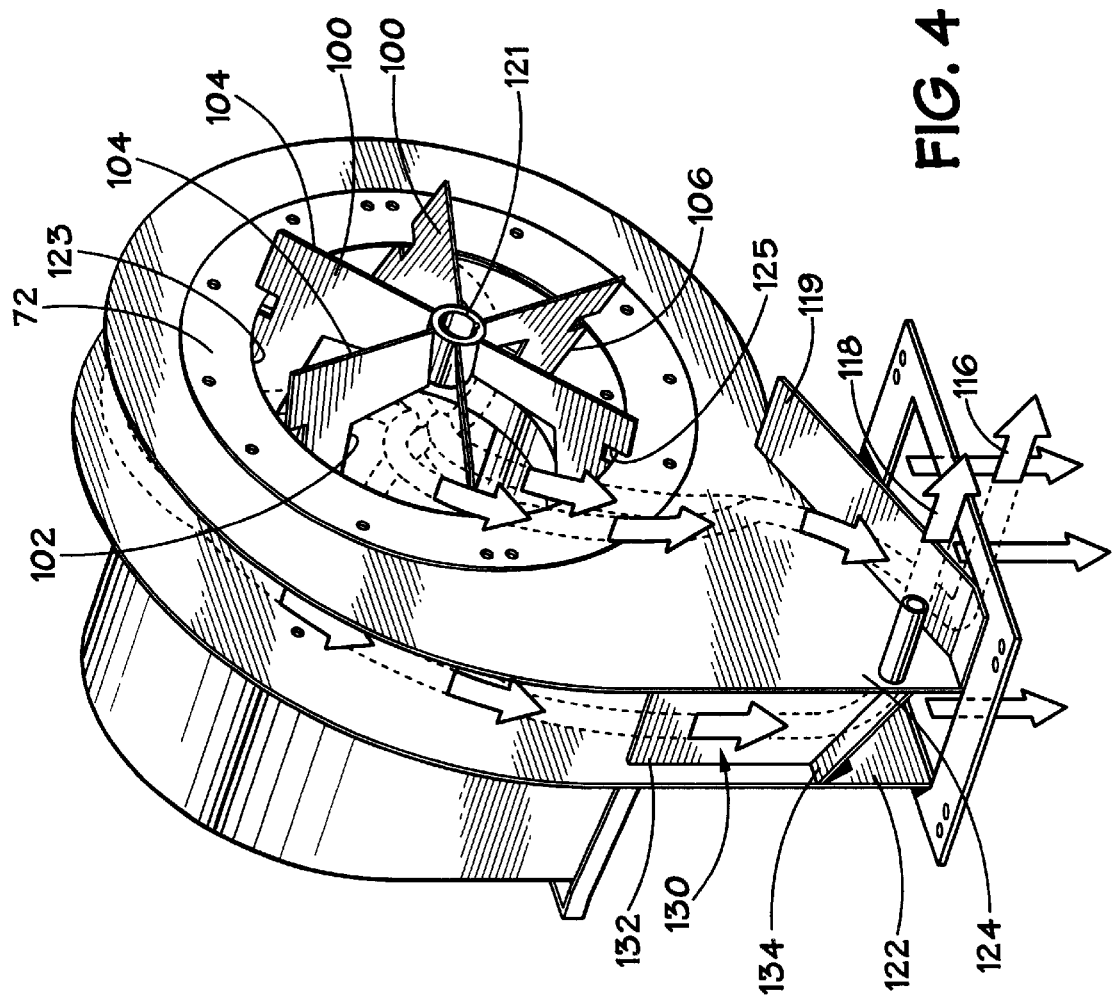
FIG. 4 is an isomeric, cut away view of the fan illustrating the centrifugal diverter and contaminant flow through the fan.
Figure 5:
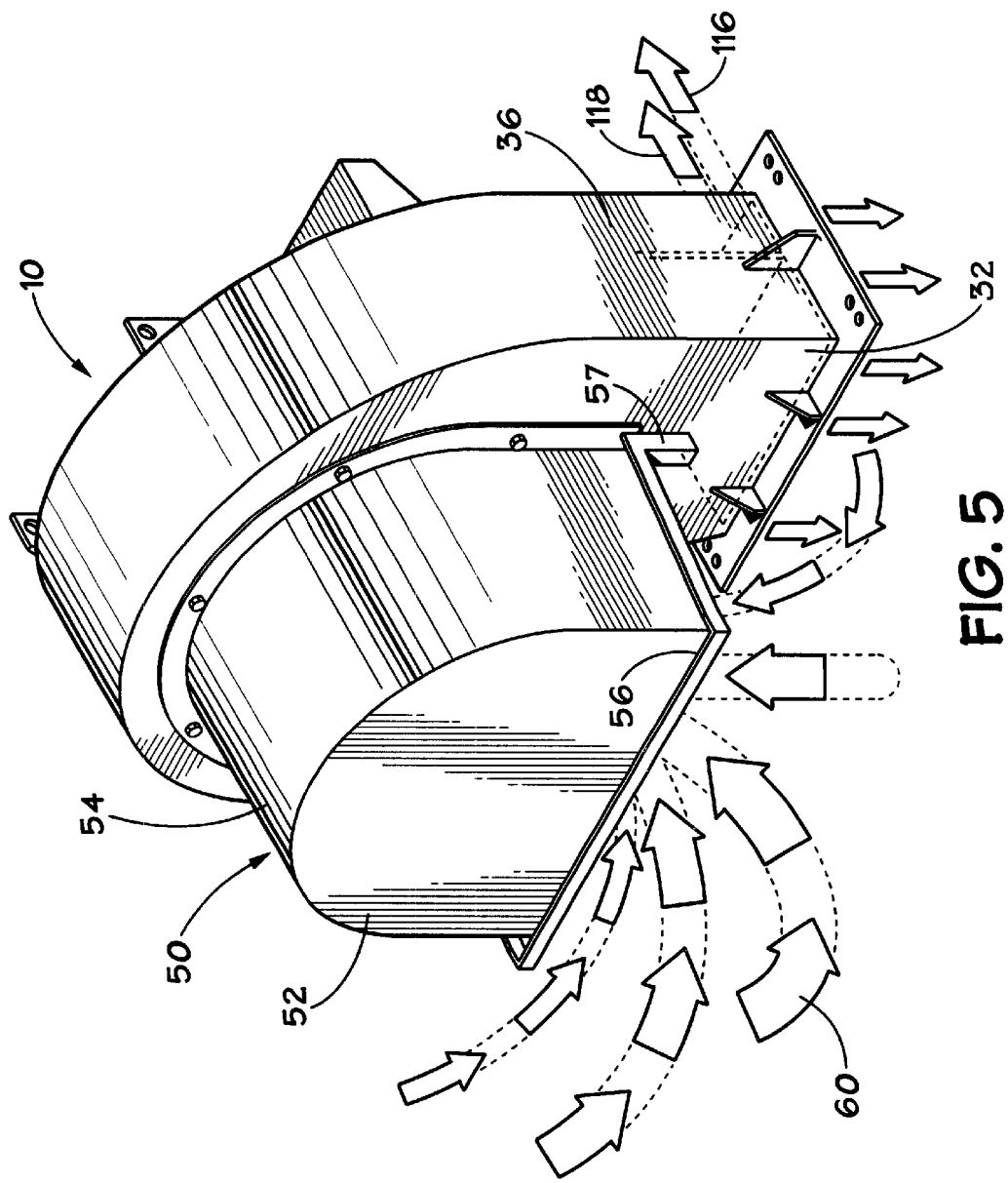
FIG. 5 is an isomeric view of the fan illustrating the cowling and air flow into the fan.

"The extracting blower of the invention is shown in FIGS. 1–5 as 10. With reference to FIGS. 1 and 2, extracting blower 10 generally comprises an impeller 20 (shown in FIG. 3) that rotates within a housing 30. Impeller 20 is driven by blower motor 40 mounted externally of housing 30. Also attached to the housing 30 is cowling 50 for introducing contaminant bearing or "dirty"air 60 into blower 10. As depicted in FIG. 3, housing 30, having a longitudinal axis A, is internally divided by into a front chamber 70 and a rear chamber 80. Specifically, an interior dividing wall 72 separates front chamber 70 from rear chamber 80. Impeller 20, also having longitudinal axis A, includes a back plate 90 and a plurality of impeller blades 100 extending therefrom. As best seen in FIG. 4, each impeller blade 100 is defined by a leading edge 102, a trailing edge 104 and an outer edge 106. Impeller 20 is mounted so as to partially extend into both front chamber 70 and rear chamber 80, thus straddling dividing wall 72. Housing 30, adjacent cowling 50, is provided with an opening 110 therein to permit dirty air 60 to be drawn into blower 10."

"Generally, dirty air 60 is entrained with unwanted liquids and solids. Dirty air 60 is drawn into blower 10 through cowling 50 by way of a pressure differential created within housing 30 by the rotation of impeller 20. In short, rotation of impeller 20 forces air through chambers 70 and 80, thereby creating a pressure drop within housing 30 with respect to the outside ambient air. In any event, dirty air 60 enters housing 30 with a certain axial momentum and impinges upon rotating impeller 20. Because they are typically heavier than the carrier air in which they are entrained, suspended liquids and solids of the dirty air 60 tend to continue in the direction of the momentum, i.e. axially toward trailing edge 104 and back plate 90. In contrast, the carrier air, being lighter, is more susceptible to the centrifugal force placed on it by the rotating impeller 20, and as such, is quickly forced along impeller blades 100 to their outer edges 106. Thus, this carrier air at outer edge 106 is in effect "cleaned" of the heavier contaminants. As to these heavier contaminants, their forward momentum causes them to eventually strike back plate 90, where the centrifugal force generated by the rotating impeller 20 causes the contaminants to migrate outward along back plate 90 and into rear chamber 80."

In the instant invention, housing 30 is of a volute or scroll-type shape as shown most clearly in FIGS. 2 and 4. Housing 30 is defined by a front wall 32, a rear wall 34 and a curving side wall 36. Front wall 32 and rear wall 34 generally correspond to the circular shape of impeller 20 but for a tangential section 38 that extends outward from said circular shape of each of said front and rear walls 32, 34. Curving side wall 36, disposed between front wall 32 and rear wall 34 defines the interior space that comprises front chamber 70 and rear chamber 80. In addition, adjacent tangential section 38, front wall 32, rear wall 34 and side wall 36 define a chute 120.

As shown in FIGS. 3 and 4, dividing wall 72 extends into chute 120 to internally divide chute 120 into a forward portion 122 and a rear portion 124. Forward portion 122 of chute 120 is in fluid communication with forward chamber 70 and rear portion 124 of chute 120 is in fluid communication with rear chamber 80. As such, carrier air at outer edges 106 of impeller 20 that has been "cleaned" of heavier contaminants is forced into the forward portion 122 of chute 120 while the heavier contaminants falling into rear chamber 80 are guided into rear portion 124 of chute 120. At this point, the carrier air within forward portion 122 of chute 120 has passed through a first stage of cleaning, thereby removing the heavier contaminants carried in dirty air 60.

The blower system described above is generally characteristic of the prior art. A drawback to the prior art of the type described above is that this "clean" air moving into chute 120 is often still entrained with smaller, lighter particulate matter and liquid droplets once it enters chute 120. It may also contain some larger contaminants that were not separated in the initial cleaning stage. These residual contaminants did not have enough mass or momentum to be separated when dirty air 60 was passing across impeller blades 100. Thus, they are still carried with the air stream as it enters the forward portion 122 of chute 120. It is at this point that the blower of the present invention passes the air stream through a second stage of cleaning.

Those skilled in the art will understand that carrier air leaving the outer edge 106 of impeller blades 100 is characterized by a certain centrifugal force that urges the air outward toward wall 36 where the air generally flows along the curving surface of wall 36. This centrifugal force has a tangential component and a radial component that effects the carrier air, and the contaminants entrained in the air, as it is urged outward towards wall 36. Because the radial velocity of this air leaving outer edge 106 of impeller blades 100 is greater than the axial velocity of the dirty air 60 entering blower 10, the lighter contaminants in the air that were not initially heavy enough so that their momentum caused "separation" from dirty air 60 in the first cleaning stage are now characterized by sufficient radial momentum that they continue to travel outward to strike against wall 36 even as the air stream in which they are entrained loses momentum much more quickly. Upon striking wall 36, these lighter contaminants, as well as any remaining heavier contaminants, follow wall 36 as it curves to form chute 120. It is at this point that the second stage of cleaning occurs.

Mounted on the interior of wall 36 within chute 120 is a skimmer 130. Skimmer 130 consists of a front skimmer wall 132 and a bottom skimmer wall 134. Skimmer 130 is positioned on wall 36 so that lighter contaminants, as well as any remaining heavier contaminants, that have been forced out against wall 36 and are traveling along the surface of wall 36 are directed into skimmer 130, thus separating the contaminants from the larger volume of air passing through chute 120. Once collected in skimmer 130, these contaminants can be diverted off with the contaminants removed in the first stage of cleaning. At this point, air exiting chute 120 has now been cleaned twice to remove contaminants entrained therein. While one preferred embodiment of the skimmer 130 has been described, it is understood that said skimmer 130 may consist of any structure disposed within said flow stream along wall 36 on which contaminates could collect and be diverted, including, without limitation, a channel or a shelf or similar structure.

Turning more specifically to the details of the blower 10, cowling 50 is mounted on the exterior of wall 32 so as to govern the entry of air 60 through opening 110. Cowling 50 consists of a front cowling wall 52, spaced apart from but substantially perpendicular to front housing wall 32. A cowling side wall 54 is partially disposed around the perimeter of front wall 52 and attaches to front wall 32 so as to form a downward facing opening 58 in cowling 50. Grate 59 covers opening 58. A rain channel 56 is formed around the perimeter of opening 58 so as to prevent rain from dripping into the flow path of air 60 entering cowling 50. Channel 56 directs runoff to drain spouts 57 disposed on either side of cowling 50 adjacent front housing wall 32. In the preferred embodiment, as best seen in FIG. 1, side wall 54 is angled so as to form an obtuse angle X at the intersection between side wall 54 and front housing wall 32. This facilitates drainage of runoff collected in channel 56. In addition, it has been found that such a configuration decreases the likelihood that environmental contaminants adjacent housing 30 are drawn into cowling 50. Specifically, such a configuration creates a greater distance between the opening 110 of housing 30 and opening 58 of cowling 30, thereby equalizing the pressure gradient across opening 58. An angle X of approximately 90 degrees or less at the intersection between side wall 54 and front housing wall 32 results in a lower pressure in opening 58 adjacent housing 30, such that dirt, rain and other contaminants that might be in the air around this portion of opening 58 are more likely to be drawn into cowling 50. It has been found that by creating the obtuse angle X as described herein, fewer contaminants are actually drawn into cowling 50 and introduced into blower 10.

In similar fashion, many prior art blowers drain runoff away from housing 30, often times locating drain spouts 57 at the forward edge of cowling 50 adjacent front cowling wall 52. This has the very undesirable result of directing the runoff into the path of air stream 60 being drawn into cowling 50. Thus, the arrangement of the angled opening and the location of the drain spouts are intended to reduce the introduction of contaminants into air stream 60 as it is being drawn into blower 10.

With reference to the FIGS. 3 and 4, the internal configuration of blower 10 is best illustrated.

In the preferred embodiment, front chamber 70 is defined by front wall 32, side wall 36, and interior dividing wall 32. Likewise, rear chamber 80 is defined by rear wall 34, side wall 36, and interior dividing wall 32. Chute 120, extends from front chamber 70 and rear chamber 80.

Chute 120 is defined to include a front chamber clean air outlet 114 which provides fluid communication between front chamber 70 and the exterior of housing 30. With respect to rear chamber 80, rear portion 124 of chute 120 includes a rear chamber heavy contaminant exhaust outlet 116 which provides fluid communication between rear chamber 80 and the exterior of housing 30. In addition, extending from skimmer 130 within forward portion 122 of chute 120 is a light contaminant exhaust outlet 118. In the preferred embodiment, light contaminant exhaust outlet 118 passes through interior dividing wall 72 and exits housing 30 adjacent heavy contaminant exhaust outlet 116. In this regard, bottom skimmer wall 134 may be angled so as to direct contaminants collected within skimmer 130 to exhaust outlet 118. Likewise, rear portion 124 of chute 120 can include a guide 119 angled so as to direct contaminants collected within rear portion 124 of chute 120 to exhaust outlet 116.

Impeller 20 includes a back plate 90 and a plurality of impeller blades 100 extending therefrom. A hub 121 may be axially attached to back plate 90 for receipt of the motor drive shaft (not shown) driven by blower motor 40. Blower motor 40 may be an electric motor, an internal combustion engine, a steam engine, a gas turbine or any other mechanical device known in the field for producing rotational power through a motor drive shaft. In the preferred embodiment, motor 40 is an electric motor.

"The plurality of impeller blades 100 are fixedly attached to back plate 90. Each impeller blade 100 extends from back plate 90, located within rear chamber 80, through an opening 123 in interior dividing wall 72 and into front chamber 80. In one embodiment, each impeller blade 100 includes an outer edge 106 which is provided with a notch 125 in impeller blade 100 adjacent interior dividing wall 72. It is well known in the art that it is desirable to provide some type of notch in impeller blade 100 at the dividing wall between the front and rear chambers of an extracting blower so as to better seal the front and rear chambers from one another, thereby decreasing the loss of clean air from the front chamber to the rear chamber and stabilizing pressure within the blower. Various notch configurations have been known and used in the art for some time and include a full notch, wherein the impeller blade 100 extends around interior dividing wall 72 in both the front chamber 70 and the rear chamber 80, and a half notch, wherein impeller blade 100 extends around dividing wall 72 in only the rear chamber 80 or front chamber 70. FIGS. 3 and 4 illustrate only a full notch configuration. Typically, in a partial notch configuration in which the notch extends around wall 72 in the rear chamber, impeller blade 100 may extend straight out to leading edge 102 or may be contoured or shaped so as to only partially extend around dividing wall 72."

In the preferred embodiment, impeller blades 100 are angularly attached to back plate 90 and hub 121. Specifically, each impeller blade 100 is attached to back plate 90 so that impeller blade 100 forms an angle of less than 90° between back plate 90 and impeller blade 100 in the direction of impeller rotation. Likewise, each impeller blade 100 may be attached to hub 121 so that the edge of impeller blade 100 is angled so as not to be in axial alignment with said hub 121. In other words, impeller blade 100 is rotated radially relative to the axis of hub 121 so that the edge of impeller blade 100 that is attached to hub 121 is not parallel with the hub axis. It has been found that by angling impeller blades 100 as they extend from back plate 90, and also relative to hub 121, the blades tend to channel or guide the heavy contaminants towards the trailing edge 104 of impeller blade 100 without the need for a channel or other similar devices. Thus, one of the drawbacks to the prior art, namely pitting and corrosion around channel structures, is avoided. Furthermore, it has been observed that such prior art channels or similar devices, attached to the surface of impeller blades, often create turbulence in the air flow across the blades, resulting in an increase in the amount of heavy contaminants that are not cleaned from the air. Such turbulence tends to result in swirling air that can lift heavy contaminants from the surface of the impeller blades and/or back plate and redistribute such contaminants in the air stream passing down into forward portion 122 of chute 120. By utilizing angled impeller blades, as described herein, the impedance of smooth air flow across the impeller blades is minimized and hence a greater quantity of contaminants are removed in first stage cleaning.

In operation, blower motor 40 of extracting blower 10 is first activated. Activation of motor 40 induces rotation of impeller 20. The rotation of impeller 20 creates a lower pressure within housing 30 relative to the outside ambient conditions, thereby drawing dirty air 60 through opening 58 of cowling 50 and into blower 10 via opening 110 in front chamber 70. Grate 59, disposed over opening 58, filters out larger contaminants from air stream 60. Likewise, rain water or other contaminants that may be running down side wall 54 of cowling 50 are collected in channel 56 and drained off, thereby preventing these contaminants from mixing with air stream 60. Finally, the pressure profile in opening 58 is maintained so as to be relatively constant across the entire opening so as not to create heightened suction adjacent front wall 32.

As previously disclosed, air stream 60 encompasses air that may include liquid and solid particle contaminants which, based on their varied nature and mass, can be classified as heavy contaminants and light contaminants. The air stream 60 entering housing 30 through air intake opening 110 enters front chamber 70 at a relatively high axial velocity. Such high velocity partly ensures that the heavier liquid and solid particles of air stream 60 travel along impeller blades 100 and strike the back plate 90. In contrast, the lighter air particles and contaminants of dirty air stream 60 are substantially diverted from striking the back plate 90 of impeller 20 by the centrifugal force imparted on them via the rotational motion of the impeller blades 100. Rather, this air is forced out to the outer edge 106 of impeller blades 100, there the air stream is directed into the forward portion 122 of chute 120.

The heavier liquid and solid particles of dirty air 60 thus enter front chamber 70 at a sufficiently high axial velocity to carry them along impeller blades 100 and into rear chamber 20, where the such heavy contaminant particles strike back plate 90. The rotational motion of impeller 20 generates a centrifugal force on the heavy contaminants striking back plate 90, forcing such contaminants radially outward from the axis of impeller 20 and back plate 90, where the particles are discharged into rear chamber 80 and rear portion 124 of chute 120. This constitutes the first stage of air cleaning in the instant invention.

As mentioned above, the lighter air particles and contaminants of dirty air 60 enter front chamber 70 at a high velocity coming off the outer edge 106 of impeller blades 100. Rotating impeller blades 100, impart both a tangential and axial force on this air stream as it is forced into tangential section 38 of chute 120. The tangential momentum imparted to these air and contaminant particles urges the clean air stream outward toward the wall 36. The lighter contaminants, having a greater mass, and thus a greater momentum, than the lighter air particles, tend to continue out to wall 36, where they strike wall 36 and flow along wall 36. The lighter air particles, tending to lose momentum before they can travel out to wall 36, are picked up by the air stream flowing through forward portion 122 of chute 120. As the lighter contaminants continue to travel along the inner surface of wall 36, they are collected by skimmer 130 where they are removed with the other heavier contaminants previously separated in the first stage cleaning. This constitutes the second stage air cleaning of the instant invention. Thus, air exiting front chamber clean air outlet 114 has been subjected to two separate stages of contaminant removal and can be used as a source for relatively clean cooling air.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. An extracting blower, comprising:
   a. a fan housing having a longitudinal axis, a front chamber and a rear chamber with an interior wall disposed within the housing to separate the front chamber from the rear chamber;
   b. a first opening in the fan housing and a second opening in the interior wall;
   c. a rotatable impeller having a longitudinal axis, located within the fan housing, the impeller disposed to extend from the rear chamber to the front chamber through the second opening in the interior wall, the impeller including a plurality of impeller blades extending outwardly from the longitudinal axis of the impeller and extending substantially along the longitudinal axis of the fan housing and through the second opening;
   d. the fan housing having a side wall, a front wall, and a rear wall, including a tangential section extending tangentially from the side wall, the tangential section, a portion of each of the side wall, front wall, and rear wall, forming a chute internally defined by a forward portion and a rear portion, wherein the forward portion of the chute is in fluid communication with the front chamber of the fan housing and the rear portion of the chute is in fluid communication with the rear chamber of the fan housing;
   e. a skimmer disposed within the forward portion of the chute, the skimmer comprising a contaminant deflection wall extending substantially along the longitudinal axis of the fan housing between the front wall and the interior wall, the contaminant deflection wall lying in a plane which is substantially parallel with the longitudinal axis of the impeller.

2. The extracting blower of claim 1, further comprising:
   a. a cowling attached adjacent the first opening, the cowling comprising a first front wall spaced apart from the blower housing, and a side wall disposed between the first front wall and the blower housing so as to form a downward facing opening for drawing air into the blower.

3. The extracting blower of claim 2 wherein the side wall includes at least one side wall edge extending from the first front wall to the blower housing, wherein the edge intersects the blower housing at an exterior angle greater ninety degrees.

4. The extracting blower of claim 3 further comprising a drainage channel extending at least partially along the edge.

5. The extracting blower of claim 4 further comprising a grate positioned over the downward facing opening and a drain spout attached adjacent the housing and in fluid communication with the drainage channel.

6. The extracting blower of claim 1, wherein the impeller blades are defined by a leading edge, a trailing edge and an outer edge, wherein at least one of the impeller blades is provided with a notch adjacent the outer edge.

7. The extracting blower of claim 6, wherein the notch extends at least partially around the interior wall where the impeller extends from the rear chamber into the front chamber.

8. The extracting blower of claim 1 wherein the impeller further comprises a back plate oriented within the rear chamber, and at least one impeller blade is oriented to for an acute angle between the impeller blade and the back plate in the direction of rotation of the impeller.

9. The extracting blower of claim 1, the impeller further comprising a back plate oriented within the rear chamber and a hub axially attached to the back plate, wherein at least one of the impellers is attached to the hub so as to be radially rotated perpendicular to the hub axis so that the hub axis is not parallel with the impeller.

10. The extracting blower of claim 1, further comprising an exterior side wall having an inner surface and an outer surface and defining the front chamber, the rear chamber and the chute, wherein the skimmer is so attached to the inner surface of the exterior side wall.

11. The extracting blower of claim 10, wherein the contaminant deflection wall of the skimmer is spaced apart from and substantially parallel with the exterior side wall, and wherein the skimmer further comprises a base plate extending between the contaminant deflection wall and the exterior side wall.

12. The extracting blower of claim 11, further comprising a contaminant port in fluid communication with the skimmer.

13. The extracting blower of claim 12 wherein the base plate is inclined to urge contaminants into the contaminant port.

14. An extracting blower, comprising:
a. a first stage air cleaning apparatus having a centrifugal impeller disposed to extend between a front clean air chamber and a rear contaminant chamber;
b. a second stage air cleaning apparatus having an air chute in fluid communication with the front clean air chamber and a skimmer disposed within the clean air chute, the skimmer comprising a contaminant deflection wall; and
c. a cowling attached adjacent the first stage air cleaning apparatus, the cowling comprising a first front wall spaced apart from the first stage air cleaning apparatus, and a side wall disposed between the first front wall and the first stage cleaning apparatus so as to form a downward facing opening for drawing air into the blower.

15. The extracting blower of claim 14 wherein the side wall includes at least one side wall edge extending from the first front wall to the first stage cleaning apparatus, wherein the edge intersects the first stage cleaning apparatus at an exterior angle greater ninety degrees.

16. The extracting blower of claim 15 further comprising a drainage channel extending at least partially along the edge.

17. The extracting blower of claim 16 further comprising a grate positioned over the downward facing opening and a drain spout attached adjacent the first stage cleaning apparatus and in fluid communication with the drainage channel.

18. The extracting blower of claim 14 wherein the impeller further comprises impellor blades defined by a leading edge, a trailing edge and an outer edge, wherein at least one of the impeller blades is provided with a notch adjacent the outer edge.

19. The extracting blower of claim 18, further comprising an interior wall separating the front clean air chamber from the rear contaminant chamber, wherein the notch extends at least partially around the interior wall where the impeller extends from the rear chamber into the front chamber.

20. The extracting blower of claim 14, wherein the impeller further comprises a back plate, a hub axially attached thereto and impeller blades extending therefrom, the impeller blades defined by a leading edge, a trailing edge and an outer edge, wherein at least one impeller blade is oriented to form an acute angle between the impeller blade and the back plate in the direction of rotation of the impeller.

21. The extracting blower of claim 20, wherein at least one of the impellers is attached to the hub so as to be radially rotated perpendicular to the hub axis so that the hub axis is not parallel with the impeller.

22. The extracting blower of claim 14, the first stage air cleaning apparatus further comprising an exterior side wall having an inner surface and an outer surface and defining the front chamber, the rear chamber and further defining the chute of the second stage air cleaning apparatus, wherein the skimmer is attached so the inner surface of the exterior side wall.

23. The extracting blower of claim 22, wherein the skimmer further comprises a first skimmer side wall spaced apart from and substantially parallel with the exterior side wall and a base plate extending between the first skimmer side wall and the exterior side wall.

24. An extracting blower, comprising:
a. a fan housing in which is defined a front chamber and a rear chamber with an interior wall disposed within the housing to separate the front chamber from the rear chamber;
b. a first opening in the fan housing and a second opening in the interior wall;
c. a rotatable impeller located within the fan housing, the impeller disposed to extend from the rear chamber to the front chamber through the second opening in the interior wall, the impeller including a back plate oriented within the rear chamber and a plurality of impeller blades extending through the second opening from the back plate;
d. the housing including a tangential section extending therefrom, the tangential section forming a chute internally defined by a forward portion and a rear portion, wherein the forward portion is in fluid communication with the front chamber and the rear portion is in fluid communication with the rear chamber;
e. a skimmer disposed within the forward portion of the chute, the skimmer comprising a contaminant deflection wall; and
f. a cowling attached adjacent the first opening, the cowling comprising a first front wall spaced apart from the blower housing, and a side wall disposed between the first front wall and the blower housing so as to form a downward facing opening for drawing air into the blower.

25. The extracting blower of claim 24 wherein the side wall includes at least one side wall edge extending from the first front wall to the blower housing, wherein the edge intersects the blower housing at an exterior angle greater ninety degrees.

26. The extracting blower of claim 25 further comprising a drainage channel extending at least partially along the edge.

27. The extracting blower of claim 26 further comprising a grate positioned over the downward facing opening and a drain spout attached adjacent the housing and in fluid communication with the drainage channel.

28. The extracting blower of claim 24, wherein the impeller blades are defined by a leading edge, a trailing edge and an outer edge, wherein at least one of the impeller blades is provided with a notch adjacent the outer edge.

29. The extracting blower of claim 28, wherein the notch extends at least partially around the interior wall where the impeller extends from the rear chamber into the front chamber.

30. The extracting blower of claim 24, wherein at least one impeller blade is oriented to form an acute angle between the impeller blade and the back plate in the direction of rotation of the impeller.

31. The extracting blower of claim 24, the impeller further comprising a hub axially attached to the back plate, wherein at least one of the impellers is attached to the hub so as to be radially rotated perpendicular to the hub axis so that the hub axis is not parallel with the impeller.

32. An extracting blower, comprising:
a. a fan housing in which is defined a front chamber and a rear chamber with an interior wall disposed within the housing to separate the front chamber from the rear chamber;
b. a first opening in the fan housing and a second opening in the interior wall;
c. a rotatable impeller located within the fan housing, the impeller disposed to extend from the rear chamber to the front chamber through the second opening in the interior wall, the impeller including a back plate oriented within the rear chamber and a plurality of impeller blades extending through the second opening from the back plate, the impeller blades are defined by a leading edge, a trailing edge and an outer edge, wherein at least one of the impeller blades is provided with a notch adjacent the outer edge;

d. the housing including a tangential section extending therefrom, the tangential section forming a chute internally defined by a forward portion and a rear portion, wherein the forward portion is in fluid communication with the front chamber and the rear portion is in fluid communication with the rear chamber; and e. a skimmer disposed within the forward portion of the chute, the skimmer comprising a contaminant deflection wall.

33. The extracting blower of claim 32, wherein the notch extends at least partially around the interior wall where the impeller extends from the rear chamber into the front chamber.

34. The extracting blower of claim 32, wherein at least one impeller blade is oriented to form an acute angle between the impeller blade and the back plate in the direction of rotation of the impeller.

35. The extracting blower of claim 32, the impeller further comprising a hub axially attached to the back plate, wherein at least one of the impellers is attached to the hub so as to be radially rotated perpendicular to the hub axis so that the hub axis is not parallel with the impeller.

36. An extracting blower, comprising:

a. a fan housing in which is defined a front chamber and a rear chamber with an interior wall disposed within the housing to separate the front chamber from the rear chamber;

b. a first opening in the fan housing and a second opening in the interior wall;

c. a rotatable impeller located within the fan housing, the impeller disposed to extend from the rear chamber to the front chamber through the second opening in the interior wall, the impeller including a back plate oriented within the rear chamber and a plurality of impeller blades extending through the second opening from the back plate, at least one impeller blade is oriented to form an acute angle between the impeller blade and the back plate in the direction of rotation of the impeller;

d. the housing including a tangential section extending therefrom, the tangential section forming a chute internally defined by a forward portion and a rear portion, wherein the forward portion is in fluid communication with the front chamber and the rear portion is in fluid communication with the rear chamber; and e. a skimmer disposed within the forward portion of the chute, the skimmer comprising a contaminant deflection wall.

37. The extracting blower of claim 36, the impeller further comprising a hub axially attached to the back plate, wherein at least one of the impellers is attached to the hub so as to be radially rotated perpendicular to the hub axis so that the hub axis is not parallel with the impeller.

38. An extracting blower, comprising:

a. a fan housing in which is defined a front chamber and a rear chamber with an interior wall disposed within the housing to separate the front chamber from the rear chamber;

b. a first opening in the fan housing and a second opening in the interior wall;

c. a rotatable impeller located within the fan housing, the impeller disposed to extend from the rear chamber to the front chamber through the second opening in the interior wall, the impeller including a back plate oriented within the rear chamber and a plurality of impeller blades extending through the second opening from the back plate;

d. the housing including a tangential section extending therefrom, the tangential section forming a chute internally defined by a forward portion and a rear portion, wherein the forward portion is in fluid communication with the forward chamber and the rear portion is in fluid communication with the rear chamber;

e. a skimmer disposed within the forward portion of the chute, the skimmer comprising a contaminant deflection wall; and f. an exterior side wall having an inner surface and an outer surface and defining the front chamber, the rear chamber and the chute, wherein the skimmer is attached to the inner surface of the exterior side wall.

39. An extracting blower, comprising:

a. a first stage air cleaning apparatus having a centrifugal impeller disposed to extend between a front clean air chamber and a rear contaminant chamber;

b. a second stage air cleaning apparatus having an air chute in fluid communication with the front clean air chamber and a skimmer disposed within the clean air chute, the skimmer comprising a contaminant deflection wall; and c. a plurality of impeller blades disposed upon the impeller blades defined by a leading edge, a trailing edge and an outer edge, wherein at least one of the impeller blades is provided with a notch adjacent the outer edge.

40. The extracting blower of claim 39, further comprising an interior wall separating the front clean air chamber from the rear contaminant chamber, wherein the notch extends at least partially around the interior wall where the impeller extends from the rear chamber into the front chamber.

41. The extracting blower of claim 39, wherein the centrifugal impeller further comprises a back plate, a hub axially attached thereto and impeller blades extending therefrom, the impeller blades defined by a leading edge, a trailing edge and an outer edge, wherein at least one impeller blade is oriented to form an acute angle between the impeller blade and the back plate in the direction of rotation of the impeller.

42. The extracting blower of claim 39, the first stage air cleaning apparatus further comprising an exterior side wall having an inner surface and an outer surface and defining the front chamber, the rear chamber and further defining the chute of the second stage air cleaning apparatus, wherein the skimmer is attached so the inner surface of the exterior side wall.

43. An extracting blower, comprising:

a. a first stage air cleaning apparatus having a centrifugal impeller disposed to extend between a front clean air chamber and a rear contaminant chamber, the centrifugal impeller having a back plate, a hub axially attached thereto and impeller blades extending therefrom, the impeller blades defined by a leading edge, a trailing edge and an outer edge, wherein at least one impeller blade is oriented to form an acute angle between the impeller blade and the back plate in the direction of rotation of the impeller; and b. a second stage air cleaning apparatus having an air chute in fluid communication with the front clean air chamber and a skimmer disposed within the clean air chute, the skimmer comprising a contaminant deflection wall.

44. The extracting blower of claim 43, wherein at least one of the impellers is attached to the hub so as to be radially rotated perpendicular to the hub axis so that the hub axis is not parallel with the impeller.

45. The extracting blower of claim 43, the first stage air cleaning apparatus further comprising an exterior side wall having an inner surface and an outer surface and defining the front chamber, the rear chamber and further defining the chute of the second stage air cleaning apparatus, wherein the skimmer is attached so the inner surface of the exterior side wall.

46. An extracting blower, comprising:
   a. a first stage air cleaning apparatus having a centrifugal impeller disposed to extend between a front clean air chamber and a rear contaminant chamber;
   b. a second stage air cleaning apparatus having an air chute in fluid communication with the front clean air chamber and a skimmer disposed within the clean air chute, the skimmer comprising a contaminant deflection wall; and
   c. an exterior side wall having an inner surface and an outer surface and defining the front chamber, the rear chamber and further defining the chute of the second stage air cleaning apparatus, the skimmer being attached to the inner surface of the exterior side wall.

47. The extracting blower of claim 46, wherein the skimmer further comprises a first skimmer side wall spaced apart from and substantially parallel with the exterior side wall and a base plate extending between the first skimmer side wall and the exterior side wall.

* * * * *

UNITED STATES PATENT AND TRADEMARK OFFICE
CERTIFICATE OF CORRECTION

PATENT NO.    : 6,648,935 B2
DATED         : November 18, 2003
INVENTOR(S)   : James E. Petersen, Jr.

It is certified that error appears in the above-identified patent and that said Letters Patent is hereby corrected as shown below:

Column 2,
Lines 3, 8, 10, 12, 26 and 34, change "reward" to -- rearward --.

Column 8,
Line 43, change "for" to -- form --.

Column 9,
Line 55, change "so" to -- to --.

Column 13,
Line 8, change "so" to -- to --.

Signed and Sealed this

Twenty-second Day of June, 2004

JON W. DUDAS
*Acting Director of the United States Patent and Trademark Office*